July 12, 1966   J. J. KING   3,260,385
APPARATUS FOR LOADING AND UNLOADING RAILWAY CARS
Filed Feb. 19, 1964   5 Sheets-Sheet 1

JOSEPH J. KING
INVENTOR

BY *John A. Young*
ATTORNEY

July 12, 1966            J. J. KING            3,260,385

APPARATUS FOR LOADING AND UNLOADING RAILWAY CARS

Filed Feb. 19, 1964            5 Sheets-Sheet 2

JOSEPH J. KING
INVENTOR

BY *John A. Young*
ATTORNEY

July 12, 1966 J. J. KING 3,260,385
APPARATUS FOR LOADING AND UNLOADING RAILWAY CARS
Filed Feb. 19, 1964 5 Sheets-Sheet 3

JOSEPH J. KING
INVENTOR

BY John A. Young
ATTORNEY

July 12, 1966   J. J. KING   3,260,385
APPARATUS FOR LOADING AND UNLOADING RAILWAY CARS
Filed Feb. 19, 1964   5 Sheets-Sheet 4

JOSEPH J. KING
INVENTOR

BY John A. Young
ATTORNEY

July 12, 1966  J. J. KING  3,260,385
APPARATUS FOR LOADING AND UNLOADING RAILWAY CARS
Filed Feb. 19, 1964  5 Sheets-Sheet 5
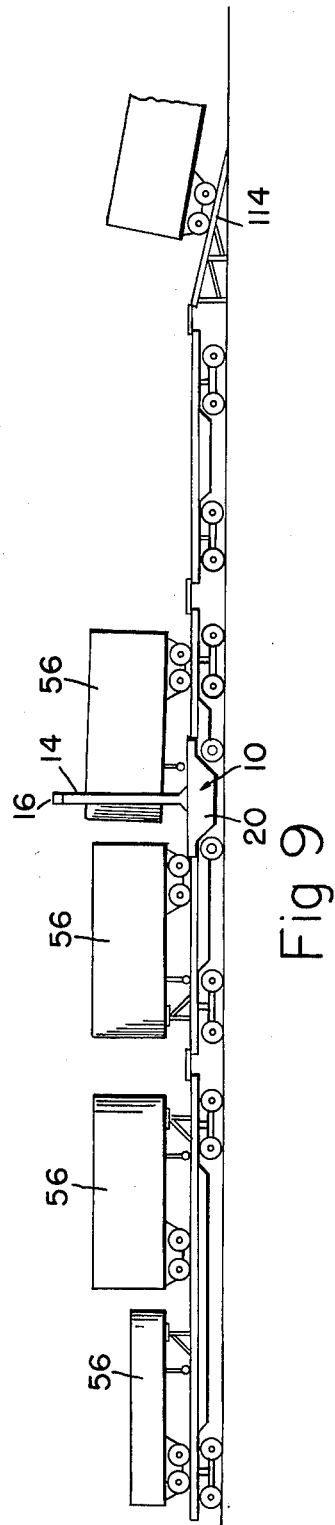
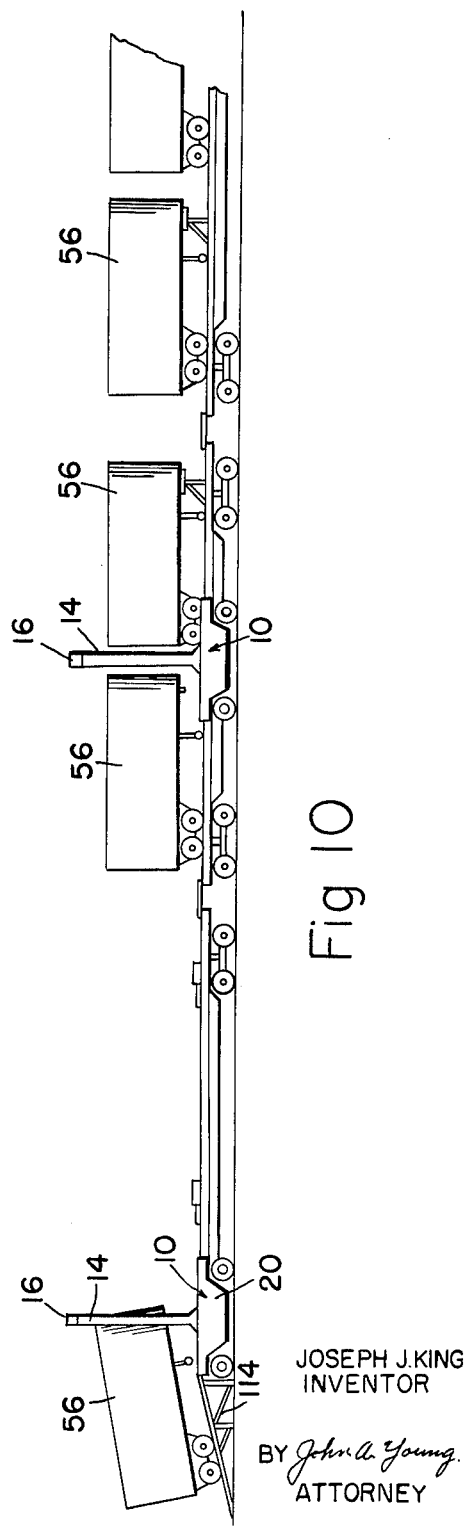
JOSEPH J. KING
INVENTOR
BY John A. Young
ATTORNEY

United States Patent Office 3,260,385
Patented July 12, 1966

3,260,385
APPARATUS FOR LOADING AND
UNLOADING RAILWAY CARS
Joseph J. King, 195 Kleber Road, Glenshaw, Pa.
Filed Feb. 19, 1964, Ser. No. 346,048
10 Claims. (Cl. 214—38)

This invention relates to apparatus for loading and unloading railway cars with truck trailers which are moved onto the flat beds of the railway car for transportation.

In the process of loading and unloading railway cars, it is necessary to effect the loading and unloading operation of the trailer onto the flat bed of the railway car in as short a time as possible. Using present methods for loading truck vans or trailers, there is required about six minutes per trailer, whereas the present invention proposes loading and unloading of the trailer in only about one minute. By reducing the time required for loading and unloading operations, there is a greater economy in the movement of freight because the train is loaded at a faster rate and the freight arrives at its destination within a shorter time.

In the process of loading vans or trailers onto flat cars, where the cars are assembled into a string or train, it is necessary to facilitate movement of the loading apparatus so that the cars can be quickly spotted on whichever railway car is desired and the loader then removed for pick up of a further trailer without being impeded by the trailers which are already spotted on the railway cars. The problem is essentially one of providing a fast moving transport means which can travel over the length of the train without impedance by either the railway car or by any of the trailers on the railway cars to effect the loading and unloading operations in as short a time as possible.

Many of the prior art devices with which I am familiar, accomplish the loading of the railway car by moving the trailer or van alongside the railway car and then loading it from the side of the railway car. In the present invention, the trailers are all loaded on the railway cars in a direction endwise of the cars. That is, the device spots the trailer or van by moving it endwise of the railway cars and moves them from one car to the next by means of efficient steering of the apparatus and also by efficient steering between the trailer and the loading apparatus while the trailer is being moved on the flat car.

The process for loading a train having a string of six to sixteen flat cars is an extensive operation and therefore the present invention is adapted so that a plurality of loading and unloading devices can be operative simultaneously. When a plurality of such devices are so used they continue to circulate in a closed path over the train, to the berth positions for the trucks then back to the train to spot the ones in the flat cars.

It is one of the foremost objects of the present invention to provide an apparatus for loading and unloading railway cars which is self-propelled and is steerable so that the vans or trailers can be quickly loaded from the ground onto a particular railway car for train transportation.

It is a further object of the present invention to provide a loading apparatus which can incorporate both ground engaging and rail engaging wheels to facilitate loading and unloading operations. The rubber tires are used during the ground transport phase of movement for the carrier and the rail engaging wheels are used to guide the proper movements for the loading apparatus.

Another important object of the present invention is to provide a loading apparatus which is adapted to straddle the train cars and is adapted to move endwise of the cars. The apparatus includes a portion attachable with the king pin of the trailer and cause it to trail in whatever direction is needed. The trailer is caused to move by the steering action of the loading apparatus. In addition to steering of the wheels of loading apparatus proper, there is further steering which can be effected between the trailer and the apparatus in either forward or reverse directions and in this way, the trailer can be accurately and precisely spotted and transferred in either trailing or non-trailing position.

It is an important feature of the present invention, that the loading device is readily coupled and decoupled from the trailer and is self-powered to move the trailer into loading position with respect to the flat car of the railway train string, it is then uncoupled after the trailer is located, the loading device being constructed for movement endwise of the railway cars and endwise of the entire string of cars to whatever extent is desired. Another important feature of the invention lies in the ability of the apparatus to clear all portions of the train and of any cars or vans thereon so that the apparatus can move without interruption; in this way, the loading and unloading operation can take place from either direction of the train.

An overall object of the present invention is to provide a simple but effective unloading device which is inexpensive, both in construction and maintenance and is capable of safely handling loads and effecting steering of the loads with a precision which reduces dropping of loads to a minimum.

Other objects and features of the present invention will become apparent from a consideration of the following description which proceeds with reference to the accompanying drawings, wherein:

FIGURE 1 is an isometric view of the unloading apparatus straddling a railway car and in the process of unloading a trailer from the railway car;

FIGURES 2, 3 and 4 progressively show steps of loading by first coupling the apparatus to the king pin of a truck (FIG. 2) the loading apparatus after the van has been moved onto the flat car (FIG. 3) and then the raising or elevating of the cross beam when the loading operation is completed (FIG. 4);

Figure 8:
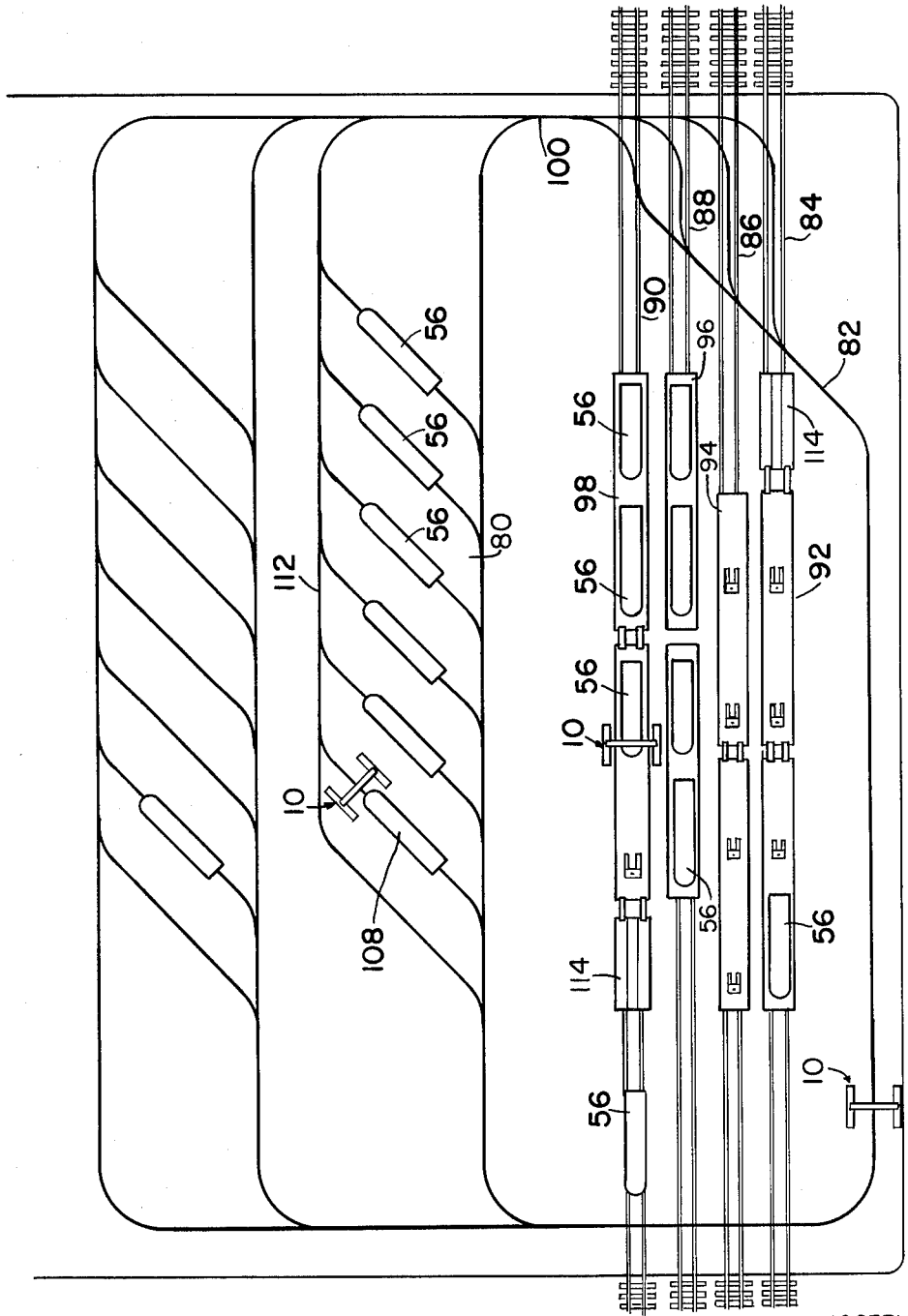

FIGURE 8 is a top or plan view of the loading area showing a string of railway cars and a number of trailers which are spotted prior to loading onto the train; and, FIGURES 9 and 10 illustrate the loading operations which occur by use of the ramp; FIGURE 9 showing the unloading of one of the vans at the extreme right-hand side of FIGURE 9 and, FIGURE 10 illustrating a loading operation occurring from the left-hand side of FIGURE 10.

Figure 1:
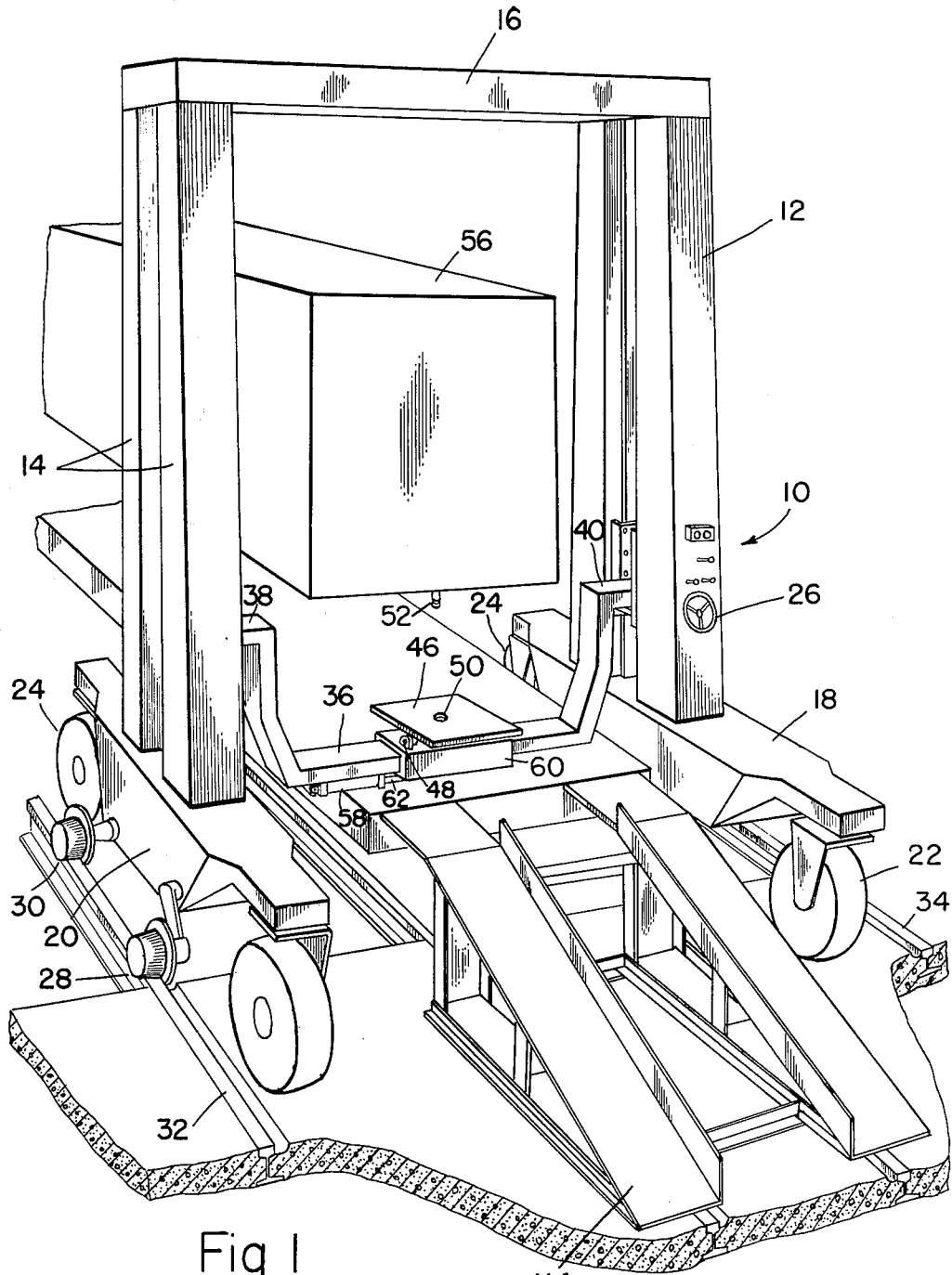

Referring now to the drawings, the apparatus designated generally by reference numeral 10 in FIGURE 1, is comprised of two pairs of upright stanchions designated 12 and 14 which are connected together by a cross beam 16 and are supported at their lower ends on pedestals 18, 20 which include ground engaging pneumatic wheels 22 and 24 fore and aft of the pedestals to facilitate ground movement of the apparatus 10 which is self-powered by a suitable engine (not shown) and is steerable by means of a wheel 26 (FIGURE 1). In addition to ground engaging wheels, there is another set of wheels 28, 30 which are flanged and engage with rails 32, 34 after wheels 28, 30 are lowered to engage with the rails and are raised or lowered to allow the pneumatic wheels 22, 24 to support the apparatus. The flanged wheels guide the apparatus for rapid movement in loading and unloading directions.

Between the stanchions 12 and 14 is a lift beam 36 associated at its opposite ends 38, 40 with power lifts 42 which are located between the respective pairs of stanchions 12, 14 to raise and lower the lift beam 36. At the center of the lift mechanism is a lift plate 46 which is pivotally mounted on pin 48 (FIGURE 7) and has a releasable connection 50 with a king pin 52 on trailer 56.

Figure 7:
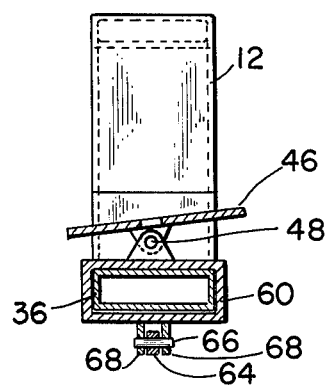
FIGURE 7 is a detail view of the attachment on the lift mechanism which is secured to the king pin.

The plate 46 is movable to the right and to the left on the cross beam 36 by a power cylinder 58 which is operatively connected with a bearing 60 slidably mounted on cross beam 36 and in supporting relation with plate 46. Thus, by actuating the power cylinder 58 it is possible to angularly steer the trailer 56 through its king pin 52 which is secured to the plate 46. Referring to FIGURE 7, a piston rod 62 of cylinder 58 is secured at its end 64 to a pin 66 which is received through aligned openings and flanges 68 are in turn secured to bearing 60 on cross beam 36. In this manner, transverse steering movement of the trailer is effected by operation of the power cylinder 58.

Figure 5:
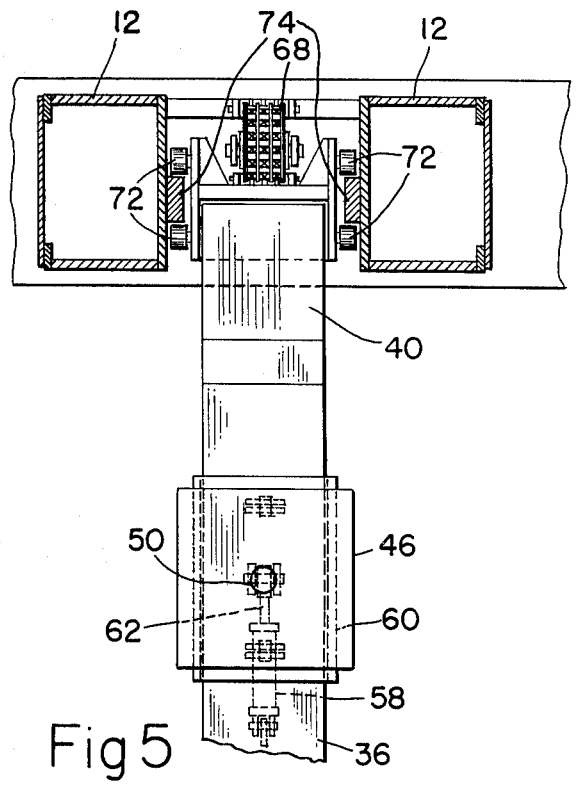
FIGURES 5 and 6 are detail views of the lift mechanism for the cross beam which is attachable to the fifth wheel of the trailer.
Figure 6:
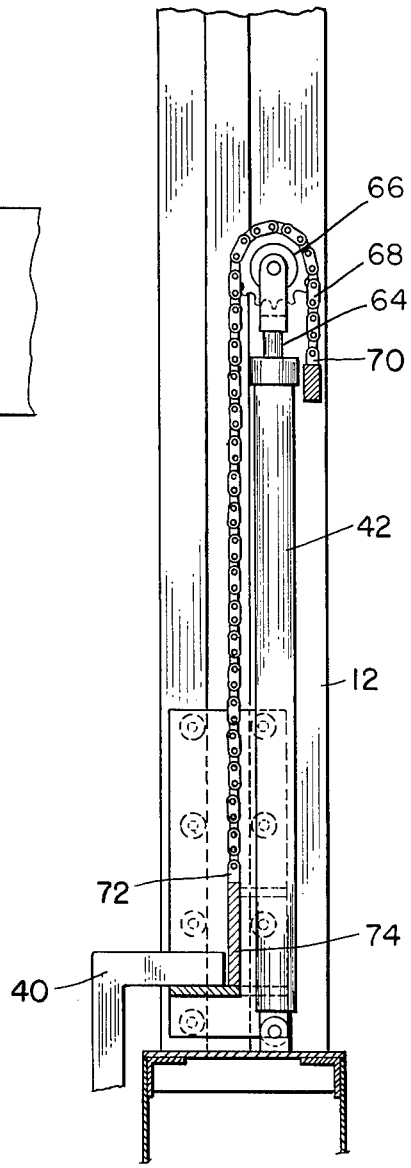

Raising and lowering of the cross beam 36 is coordinated with loading and unloading operations. For example, during initial coupling with the trailer, the cross beam 36 is at its lowermost position and is raised as the trailer is towed onto the flat car. Finally, after the trailer has been spotted, the cross beam 36 is brought to its uppermost position (shown in FIGURE 4). The described lowering and raising of the cross beam 36 is accomplished by power cylinder 42 (FIGURE 6) having a piston rod 64 with a rotatable sprocket wheel 66 which meshes with the chain 68 secured at its end 70 to stanchion 12 and after passing over the sprocket wheel 66, is fastened at the other end 72 to a flange 74 secured to an end 40 of the cross beam 36. The raising and lowering movements are further guided between the pairs of stanchions 12 (FIGURE 5) by guide rollers 72 which engage complementary guide flanges 74 on the stanchions to insure rectilinear up and down movements of the ends of the cross beam 36.

In the raised position (FIGURE 4) of the lift beam, the life beam will clear the trailer, enabling the apparatus to move freely endwise of the train without interfering in any way with either the flat car or any of the trailers which have been spotted on the flat cars. In this way, the apparatus can move freely in its loading and unloading operations, and the train can be decoupled at any point and loading commenced and stopped at that point. The invention, of course, is not confined to the movement of any particular size of trailer, for example as shown in FIGURE 9, the trailers can vary in shape and size, and generally, more than one trailer is carried per flat car. For example, as shown in FIGURE 9 there are two flat cars located on a respective railway car.

In operation, referring to FIGURE 8, there is generally provided a number of trailers 56 in the loading zone designated generally by reference numeral 80. The loading apparatus 10 which is self-propelled and is highly mobile, can follow generally the path indicated by line 82, cutting across tracks 84, 86, 88, 90 on which there are strings of flat cars designated generally by reference numerals 92, 94, 96 and 98. The loading apparatus follows the path indicated by numeral 100 and fastens onto one of the trailers, for example, the lowermost trailer 108, which is coupled with loading apparatus 10 and is then towed along path 112 for loading onto one or the other of the string of railway cars on the tracks.

The attached trailer is spotted on a desired one of the flat cars. The train is generally loaded from one end to the other, the loading generally commencing by locating a ramp 114 (FIGURE 1) at the loading end of the train and in this way the trailer is raised to the level of the bed of the railway car and is then moved along the length of the string of cars to a desired one of the flat cars.

The trailer is coupled to the moving apparatus by connecting 50 of the plate 46 on cross beam 36 to a king pin 52 on the trailer. The towed trailer is then steered to the flat car and guided into loading position on the flat car by steering the wheels 22 through a steering wheel 26; further steering can be effected by laterally moving the flat plate 46 through the power cylinder 58 which can crab the angle between the trailer and the tow apparatus.

Even though the loading apparatus 10 is confined to rectilinear movement, it is still possible to steer the railway car by angularly moving the king pin axis attachment with the plate 46. In this way, the trailer is accurately spotted and there is little or no danger of a trailer slipping off of the flat car while it is being loaded onto the flat car. It is generally most convenient to maintain the trailer in "tow," that is, with the trailer in "trail" position for even steering, this being achieved by having the tow apparatus precede the trailer in the direction of travel in order to facilitate movement of the trailer.

Where a considerable amount of loading takes place, it is convenient to provide a second pair of parallel tracks 32, 34 in combination with and in addition to the tracks 84, 86, 88 and 90 which support the railways cars so that after the trailer is moved into load position, the flanged wheels 28, 30 of the loading apparatus are lowered and come into engagement with the rails 32, 34 to ensure rectilinear movement of the trailer. Thereafter, the apparatus is confined to movement defined by the rails 32, 34. Any limited steering which might be required thereafter can be readily accomplished through crabbing the angle between the apparatus 10 and the trailer by the power cylinder 58.

Figure 4:
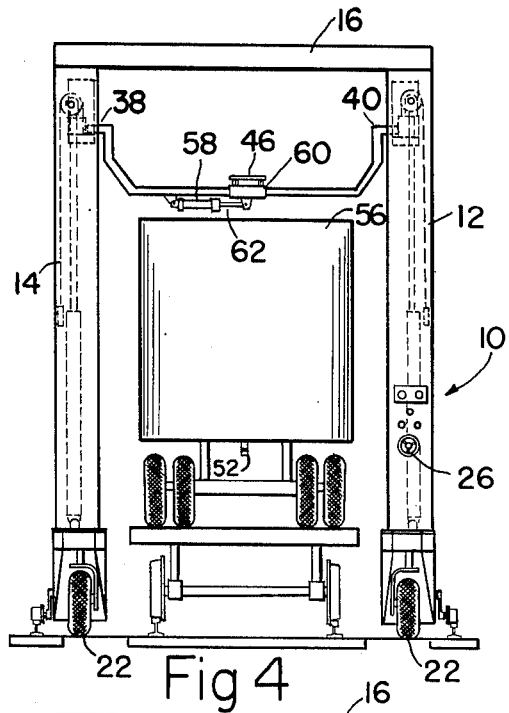

Once the trailer is spotted on the flat car, the lift cylinders 42 are actuated to lower the plate 46 and decouple with king pin 52, the plate 46 is moved out from under the trailer and power cylinder 42 is again actuated to raise the cross beam to the position shown in FIGURE 4 in which position the cross beam will clear both the railway flat car and any of the trailers which are mounted on the flat car, enabling the apparatus 10 to travel freely endwise of the string of cars. Once the self-propelled apparatus has cleared the cars, it can then cut across the tracks to connect with a further trailer.

Figures 2, 3:
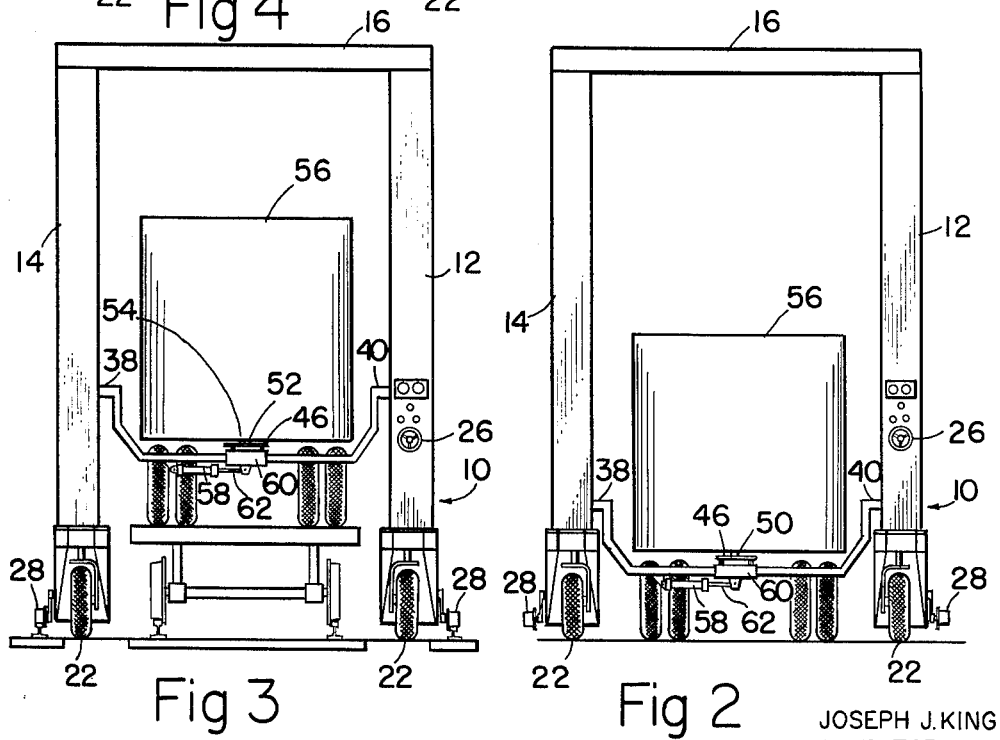

The trailers are unloaded in approximately the same manner described for loading except that the process is reversed. The unloading occurs generally in the opposite direction from loading in order to maintain the trailers in trail position. Thus, referring to FIGURE 8, the train is loaded from right to left and is unloaded from left to right. During unloading, the apparatus 10 is moved into the position shown in FIGURE 3, for coupling with the cars and the trailers are drawn off of the flat cars and down the ramp at the left end of the string of train (FIGURE 8) the general position of the parts being as shown in FIGURE 2 when the trailer reaches ground level. The trailer is then spotted in the unloading area and after the train is completely emptied, the flat cars are returned or loaded with different cargo.

Any particular trailer can be unloaded by simply bringing the cross beam into coupling position with the king pin of the trailer and the apparatus 10 tows the attached trailer endwise of the string and the trailer is taken to the part desired and is then decoupled. Any particular flat car can be unloaded by decoupling the car and the ramp spotted at whatever car is required to be unloaded. Where the string of railway cars is substantial, a number of the loading apparatus can be used simultaneously, i.e., loading can occur from both ends of the train simultaneously. There are generally a series of continuously circulating unloaders which travel in a closed path from the storage or pick up area down through the train to spot the attached trailer, then past the removing car and return to the pick up area. In certain cases, loading can take place without the trailer being in "trail," that is, the loading can be in a position in which the apparatus 10 during loading is behind the trailer instead in advance of it in which case the movement of the trailer can be regulated by operation of the cylinder 58 which crabs the angle between the lift plate 46 and the king pin of the trailer.

One of the important features of the present invention is that the loading and unloading takes place with substantially no drop-off of the cargo. Obviously, it would be very undesirable to follow any loading procedure in which it is possible for the trailer to be either incorrectly spotted on the flat car or inadvertently moved off the flat car, falling off of its edges. The chances of this occurring are obviated in the present invention, by reason of the dual steering effected by steering the wheels 22 and by crabbing the angle between the trailer and apparatus at the fifth wheel by the power cylinder 58.

The present invention has achieved the objects of quickly loading and unloading the cars by permitting the apparatus 10 to move endwise of the train and also permitting such movement unimpeded by any of the spotted trailers; this arises, because of the ability of the apparatus to straddle the car and with the lift portion raised the apparatus can pass over the top of the trailer.

Also, because of the ability of the apparatus to steer an attached trailer whether the trailer is in tow position or not, it is possible to load and unload a string of coupled flat cars even though all of the vehicles are not loaded the same. That is, some instances a "piggy back" flat car has been placed on a train in a direction opposite to the majority of the other cars, in which case the spotted trailer does not face in the same direction as the other trailers and they must therefore be steered off the cars in other than "trail" position.

The tow apparatus in addition to having a capability of moving the trailers on the flat car also has sufficient power to move the flat car itself, this being a valuable adjunct to the general operation of the apparatus.

Efficient handling of piggy back trailers has not only to do with the loading and unloading flat cars, it also involves economic handling procedures for storage at the siding, and the present invention has considerable importance in importing the capability of moving over open ground as well as on tracks and is therefore highly useful for the handling of trailers and transferring them between the train and the storage zone.

Some storage areas have a sufficient flow of traffic to warrant a substantial degree of mechanization, in which case, it is contemplated that the apparatus 10 can be adapted for automatic as well as manual operations. It should be understood, however, from the foregoing description that the apparatus 10 is capable of quickly transferring trailers from their berth positions into the flat car and for unloading the trailers from flat cars and transferring them to suitable berth position in a rapid manner, which is at all times safe in the technique of handling the trailer.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention to suit individual design requirements and it is intended that such revisions and adaptations which incorporate the herein disclosed principles will be included within the scope of the following claims as equivalents of the invention.

I claim:

1. A loading apparatus for transferring trailers having king pin members onto flat cars for transportation comprising: two upright wheel supported members spaced apart by an amount greater than the width of a railroad flat car and adapted to provide vertical support for at least a portion of the weight of the trailer; a cross member extending between and operatively connected at its opposite ends to said upright members and having a transversely movable connection which is releasably secured to the king pin of said trailer, means for actuating said transversely movable connection means for raising and lowering said cross member as the trailer is pulled into the flat car from the end thereof, and power means for moving said wheel supported members and thereby translating the attached trailer onto the flat car.

2. Apparatus for unloading and loading trailers onto railroad cars comprising: carrier means having uprights including spaced ground-engaging wheels providing a clearance therebetween whereby the carrier can straddle the width of a railroad flat car for travel between opposite ends of the car and proportioned to extend over the top of said car and trailer mounted thereon, tow means extending between said uprights and operatively connected to said uprights, said tow means being transversely movable relatively to said railroad car, said tow means being adapted for releasable operative connection with said trailer, means for raising and lowering said tow means during loading of the trailer and thereafter for disposing said tow means overhead of the trailer for travel of said carrier means endwise of the railway cars; and power means for moving said carrier together with its attached trailer.

3. The apparatus in accordance with claim 2 including: means for laterally moving the releasable connection of said tow means to effect steering of the trailer into a preferred load position on the flat car.

4. The apparatus in accordance with claim 2 including: means for laterally moving the releasable connection of said tow means to effect steering of the trailer into a preferred position on the flat car; and ground-engaging steering means for directing the tow apparatus into loaded position with respect to a flat car onto which the trailer is drawn endwise of the said flat car.

5. Apparatus for loading and unloading trailers from railroad cars and movable along a string of said cars for such loading and unloading operations, comprising at least two upright stanchions one on each side of the apparatus and spaced apart to provide for straddling of the railroad car and movement endwise of the car, said stanchions being proportioned to be of greater height than the height of a trailer on the bed of the railroad car; tow means transversely movable relatively to said stanchions and having opposite ends one operatively secured to each of said upright stanchions and adapted to be raised to the upper ends of said stanchions to a height greater than said trailers on the beds of the railroad cars to provide clearance which enables the apparatus to move endwise of the string of railroad cars, and means for raising and lowering said tow means to effect operative releasable tow connections between said tow means and said trailer at the towed end thereof and subsequently for vertically clearing a trailer after it is installed on a railroad flat car.

6. The apparatus in accordance with claim 5, including: means for laterally displacing the operative connection between said tow means and trailer to effect steering between the trailer and apparatus to assist in locating the trailer on the railroad car.

7. The apparatus in accordance with claim 6, including: means for steering the apparatus to assist in locating the trailer on the railroad car.

8. Apparatus including steerable wheels for loading and unloading trailers from railroad cars and movable along a string of said cars for such loading and unloading operations, comprising at least two upright stanchions one on each side of the apparatus, and spaced apart to provide for straddling of the railroad car and movement endwise of the car, said stanchions being proportioned to be of greater height than the height of the trailer on the bed of the railroad car, tow means having opposite ends secured one to each of said upright stanchions and adapted to be raised to the upper end of said stanchions to a height greater than said trailers on the beds of the railroad cars to provide clearance which enables the apparatus to move endwise of the string of railroad cars, means for raising and lowering said tow means to effect operative releasable tow connection with said trailer and subsequently for vertically clearing a trailer after it is installed on a railroad flat car; means for laterally displacing the operative connection between said tow means and trailer to effect steering between the trailer and apparatus, and means for steering the apparatus to assist in locating the trailer on the railroad car and ramp means disposed at the end of a railroad car for assisting in raising the trailer onto the platform of the railroad car.

9. Apparatus for loading and unloading trailers on railroad cars comprising: two upright vertical support members having ground-engaging wheels and rail-engaging wheels respectively, means for controllably bringing one or the other of sets of wheels into supporting position, said vertical support members being spaced apart by an amount providing straddling of the railway car, a laterally movable lift means mounted at its opposite ends to said upright vertical support members respectively and including a transversely movable portion thereon adapted for relative movement with respect to said vertical support members, said latter removable lift means having a releasable connection with said trailers whereby upon its transverse movement said trailers are caused to be steered in the desired direction, means for raising said lift means together with the attached trailer and translating said trailer to the point of lift onto the railway car as the vertical support members are caused to travel on one or the other of its associated sets of wheel supports.

10. Apparatus for towing and placing trailers on railway cars and the like, comprising: at least two upright stanchions disposed one on each side of the apparatus and spaced apart by an amount adapted to provide for straddling both the trailer and railway flat car for movement endwise of the trailer either at ground level or on said flat car, said stanchions being dimensioned of a greater height than the combined height of the trailer and flat car, tow means having opposite ends secured one to each of said upright stanchions and adapted to be raised to the upper end of said stanchion to a height greater than said trailers at either ground level or on said trailer, means forming a tow connection, means for raising and lowering said tow connection to effect an operative connection with said trailer through its king pin, said tow means being raisable at the forward towed end of the trailer both while the wheels are in ground-engagement and are being elevated to the support platform of the flat car, means for laterally displacing said operative connection between said tow means and trailer to effect steering between the trailer and apparatus, and additional steering means for steering the ground-engaging wheels of said apparatus to further assist in locating the trailer at a preselected position, said ground-engaging wheels having power means to tow the trailer with, together with said raisable tow means adapted to tow the trailer at either a substantially level attitude or in an inclined attitude during loading and unloading of a trailer onto the flat car.

References Cited by the Examiner
UNITED STATES PATENTS

| | | | |
|---|---|---|---|
| 869,689 | 10/1907 | Brown | 104—162 X |
| 2,063,913 | 12/1936 | Fitch | 212—13 |
| 2,238,237 | 4/1941 | Thompson | 214—46.34 |
| 2,630,766 | 3/1953 | Wunsch. | |
| 2,718,195 | 9/1955 | Bock et al. | |
| 2,884,870 | 5/1959 | Day | 214—38.8 X |
| 2,886,196 | 5/1959 | Mills | 214—394 X |
| 3,061,110 | 10/1962 | Montgomery | 212—14 |
| 3,081,884 | 3/1963 | Minty | 214—38.42 X |

FOREIGN PATENTS 145,615   6/1962   Russia.

HUGO O. SCHULZ, *Primary Examiner.*
GERALD M. FORLENZA, *Examiner.*